United States Patent
Lee et al.

(10) Patent No.: US 7,672,796 B2
(45) Date of Patent: Mar. 2, 2010

(54) METHOD TO EVALUATE A PERFORMANCE OF A CONTROL VALVE AND A SYSTEM THEREOF

(75) Inventors: Joseph Ching Hua Lee, Singapore (SG); Sharad Vishwasrao, Singapore (SG); Naveen Kashyap, Singapore (SG); Emelin Ornelas, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 57 days.

(21) Appl. No.: 11/820,142

(22) Filed: Jun. 18, 2007

(65) Prior Publication Data

US 2008/0077335 A1   Mar. 27, 2008

(30) Foreign Application Priority Data

Sep. 5, 2006   (SG) ................ 200606108

(51) Int. Cl.
    *G01F 1/34* (2006.01)
(52) U.S. Cl. ............... 702/47; 702/100; 73/861.52
(58) Field of Classification Search ........... 702/47, 702/100; 73/861.52
    See application file for complete search history.

(56) References Cited

U.S. PATENT DOCUMENTS

2008/0059084 A1* 3/2008 Wang et al. ............ 702/47

* cited by examiner

*Primary Examiner*—Drew A Dunn
*Assistant Examiner*—Hien X Vo
(74) *Attorney, Agent, or Firm*—Westerman, Hattori, Daniels & Adrian, LLP

(57) ABSTRACT

A method for providing a system for establishing a control valve performance in a process operation. The system includes establishing an expected flow rate for a control valve by measuring a differential pressure between an upstream and downstream position of a control valve of interest and using the formula $$Q = Cv \times \varphi(x) \times \sqrt{\frac{\Delta P}{G}},$$

measuring an actual flow rate across the control valve, comparing the actual flow rate with the expected flow rate to determine the difference in value between the actual and expected flow rate, determining if the difference is within an acceptable range of values from the expected flow rate and establishing the performance of the control valve.

11 Claims, 4 Drawing Sheets

METHOD TO EVALUATE A PERFORMANCE OF A CONTROL VALVE AND A SYSTEM THEREOF

FIELD OF THE INVENTION

The present invention relates to the field of control valve performance evaluation.

BACKGROUND OF THE INVENTION

Control valves are used throughout an operating process, to modulate the flow of the fluid through conduits to meet process needs. The control valves perform in response to a signal from a control system to modulate fluid supply to the process according to the needs. It is imperative that the performance of each control valve is kept in check, especially in sensitive processes where slight variations in the supply may affect the output of the process.

Presently, as part of process monitoring and control functions, operators retrieve and interrelate vast amounts of data from the control system in order to build appropriate mental models of the process. Operators rely on these mental models to proactively diagnose control valve and loop performance to thereby evaluate a performance of the control valve. Operators experience plays a key role in the robustness of these mental models.

Different operators may have different sets of mental models, which are formed after years of experience with particular control valves. No consistency may exist when diagnosing and determining control valve and loop performance (especially between experienced and novice operators).

Comparing the operating statistics with that of the manufacturer provided statistics is not ideal as the manufacturer provided data does not take into account the installed characteristic of the valve.

Presently, offline stroke tests are performed to evaluate the performance of the control valves. This is not desirable, as the process will be adversely affected by the downtime during the offline stroke tests.

On the other hand, the performance of control valves must be constantly checked as performance variations of the control valves may be caused by leakage and/or bypass open situations. Should these situations not be arrested early, the extent of damage imparted to a process will be great.

It is an object of the present invention to eliminate or address one or more of the above problems.

SUMMARY OF THE INVENTION

According to a first aspect of the invention, there is provided a method for establishing an expected flow rate through a control valve having a determined valve flow coefficient, this method including the steps of measuring a pressure at an upstream and downstream position of the control valve, determining a differential pressure value between the upstream and the downstream position of the control valve, establishing an expected flow rate using a flow rate formula of:

$$Q = Cv \times \varphi(x) \times \sqrt{\frac{\Delta P}{G}}$$

where Q=flow rate,
  Cv=valve flow coefficient
  ΔP=differential pressure value between the upstream and the downstream position of the control valve
  G=specific gravity of fluid, and
  φ(x)=an inherent characteristic of the valve Preferably, the expected flow rate for a linear valve is established where the inherent characteristic is directly related to the valve opening or control valve lift with the relationship φ(x)=x, where x is a measure of the valve opening Therefore, for linear valves, the expected flow rate is obtained using the flow rate formula of:

$$Q = Cv \times x \times \sqrt{\frac{\Delta P}{G}}$$

Preferably, the expected flow rate for an equal percentage valve is established where the inherent characteristic φ(x) is the relationship $\varphi(x) = R^{-(1-x)}$, where R is a rangeability and x is a measure of the valve opening Therefore, for equal percentage valves, the expected flow rate is obtained using the flow rate formula of:

$$Q = Cv \times R^{-(1-x)} \times \sqrt{\frac{\Delta P}{G}}$$

Using the method of above, real time flow through a control valve may be obtained through non-invasive means. It is to be appreciated that a performance of a control valve may be induced using a measured expected flow rate as a baseline for a comparison to be made.

According to a second aspect of the present invention, there is provided a method for providing a system for establishing a control valve performance in a process operation, said system including establishing an expected flow rate for a control valve by measuring a differential pressure between an upstream and downstream position of a control valve of interest and using the formula $$Q = Cv \times \varphi(x) \times \sqrt{\frac{\Delta P}{G}},$$

measuring an actual flow rate across the control valve, comparing the actual flow rate with the expected flow rate to determine the difference in value between the actual and expected flow rate, determining if the difference is within an acceptable range of values from the expected flow rate and establishing the performance of the control valve.

Following the method of above, a user is able to establish a performance of a control valve without the need to have prior experience with the control valve.

Preferably, the step of establishing the performance of the control valve further includes providing a tolerance range within which the performance of the control valve is acceptable.

Still preferably, the step of establishing the performance further includes providing a result of the performance of the control valve, where when the actual and expected flow rate values differ within the tolerance range, the performance of the control valve is acceptable, and when the measured and expected flow rate values differ out of the tolerance range, the performance is unacceptable.

According to a third aspect of the present invention, there is provided a method for providing a system for establishing a control valve performance in a process operation said method establishing an expected flow rate for a plurality of control valves used in a process operation, tabulating the expected flow rate values for a plurality of control valve opening for each plurality of control valves used in a process operation, providing an input means to receive an input value for a measured flow rate across a control valve, comparing the input value of a measured flow rate and with the tabulated expected flow rate value for the control valve; and establishing it performance of the control valve is acceptable.

Preferably, the step of establishing the performance further includes providing a tolerance range within which the performance of the control valve is acceptable.

Still preferably, the step of establishing the performance further includes providing a result of the performance of the control valve, where when the input and expected flow rate values differ within the tolerance range, the performance of the control valve is acceptable, and when the measured and expected flow rate values differ out of the tolerance range, the performance is unacceptable.

According to a fourth aspect of the invention, there is provided a system for establishing a control valve performance, said method including a flow meter to measure an actual flow rate across a control valve, a database having at least an expected flow rate for a control valve, and a comparator to compare the actual and expected flow rate to establish the performance of the control valve.

Preferably, the system further includes an input means to receive an input value of the actual flow rate across the control valve.

Still preferably, the system further includes a database having a tolerance range within which the performance of the control valve is acceptable.

Still preferably, the system further includes an output means to indicate a performance of the control valve.

Preferably, the output means is a display indicating the performance of the control valve.

According to a fifth aspect of the invention, there is provided a method of using a system of the present invention, the method including the steps of obtaining a value of an actual flow rate across the control valve, inputting the value of the measured actual flow rate into the system, receiving an output difference in value between the actual and expected flow rate and receiving an information of the performance of the control valve.

According to a sixth aspect of the invention, there is provided a method of using a system of the present invention, the method including the steps of identifying a type of control valve of interest, said types including a linear valve and an equal percentage valve, or location of valve, obtaining a value of an actual flow rate across the control valve, inputting the value of the actual flow rate into the system, receiving an output difference in value between the actual and expected flow rate and receiving an information of the performance of the control valve.

DESCRIPTION OF THE FIGURES

In order that the present invention might be more fully understood, embodiments of the invention will be described, by way of example only, with reference to the accompanying drawings, in which.

In each of the aspects and variations, the same reference numerals have been used for similar components, merely for ease of understanding the specification.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill of the art that the present invention may be practiced without these specific details. In other instances, well known methods, procedures, components, and features have not been described in detail as not to unnecessarily obscure aspects of the present invention.

Figure 1:
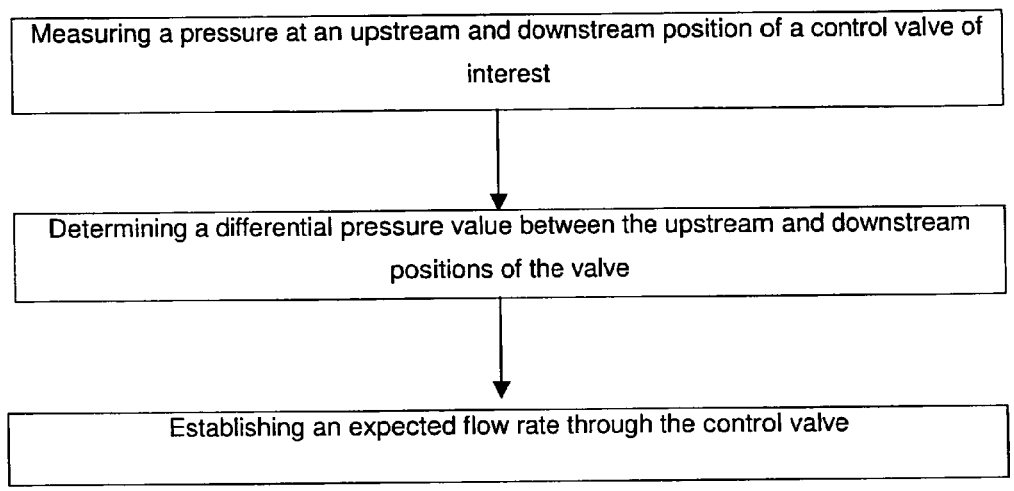
FIG. 1 shows a first aspect of the present invention depicting the method steps for establishing an expected flow rate through a control valve.

According to a first aspect of the invention as shown in FIG. 1, there is provided a method of establishing an expected flow rate of a fluid through control valve having a determined valve flow coefficient. The method involves the steps of measuring a pressure at an upstream and downstream position of the control valve of interest, determining the differential pressure between the upstream and downstream positions and establishing an expected flow rate through the control valve. The expected flow rate is established using the flow rate formula of $$Q = Cv \times \varphi(x) \times \sqrt{\frac{\Delta P}{G}}$$

Q=flow rate,
Cv=valve flow coefficient,
ΔP=differential pressure valve between the upstream and the downstream position of the control valve,
G=specific gravity of fluid, and
φ(x)=an inherent characteristic of the valve.

The performance values provided by a manufacturer does not take into account the 'installed' valve characteristics, which have a bearing on the actual, or expected flow through a control valve. Therefore, an indication, or performance of a control valve may not be obtained from a manufacturer's data sheet.

There are broadly two different kinds of control valves—linear valve and equal percentage valve. The establishment of the expected flow rate differs. For linear valves, the expected flow rate, Q is obtained by substituting the symbol φ(x) with the value of the valve opening. Therefore, as an example, when the valve is half opened, i.e. 0.5, φ(x) therefore becomes 0.5, and this value is input into the equation.

For equal percentage valves, the expected flow rate, Q, is obtained by substituting the symbol φ(x) with the equivalent, whereby the relationship $\phi(x)=R^{-(1-x)}$ exists, where R is a rangeability and x is a measure of the valve opening Therefore, as an example, where an equal percentage valve is used with R=30, and when the valve is half opened, i.e. x=0.5, by the equation above, φ(x) therefore becomes 0.18, and this value is input into the equation Following the method of above, the expected flow rate at various valve openings may be obtained, which will then serve as a basis for comparison when comparing the actual flow rate and an expected flow rate at a particular valve opening to establish a performance of the control valve. In this method, establishing the performance of the control valve is non-invasive and doest not require the downtime of the control valve, and therefore the process line will not be affected.

Figure 2:
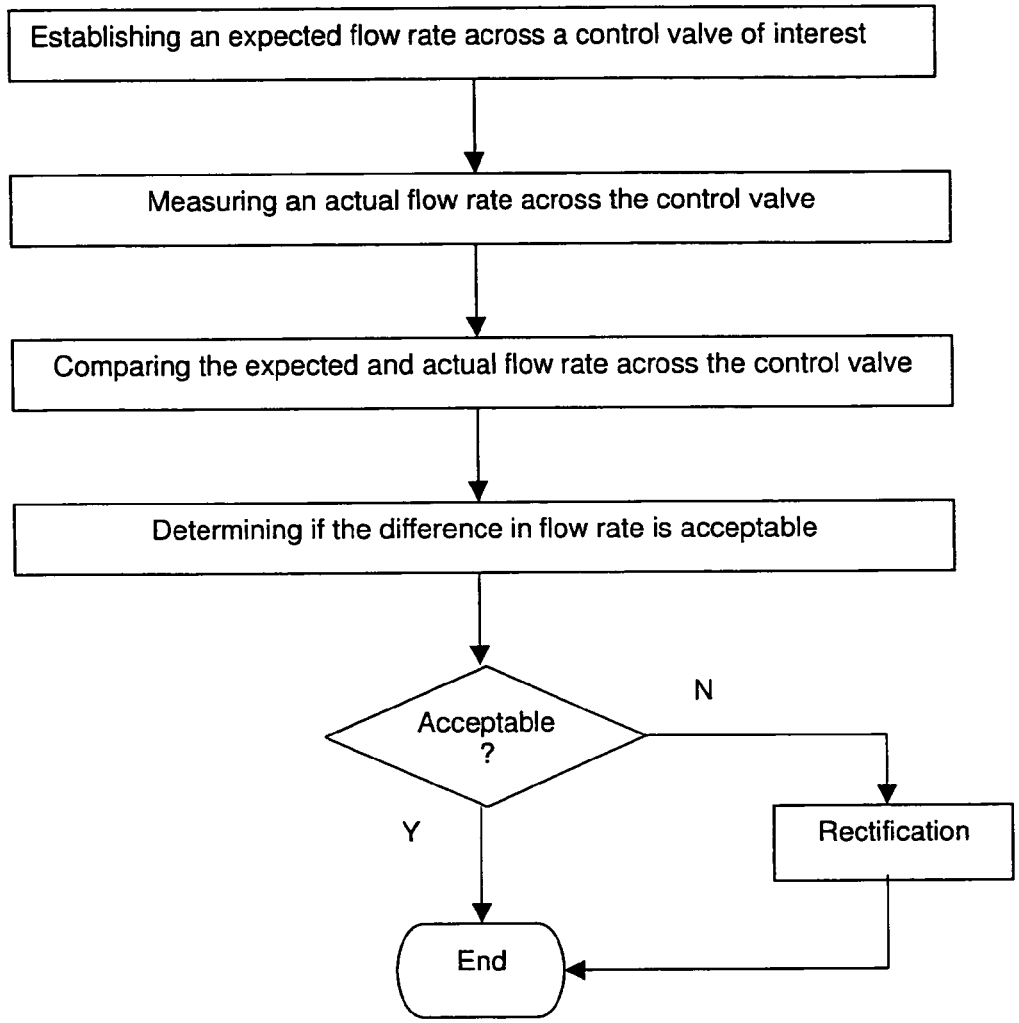
FIG. 2 shows a second aspect of the present invention depicting the method steps for establishing a performance of a control valve.

According to a second aspect of the invention as seen in FIG. 2, the method provides for establishing an expected flow rate of a control valve at a particular valve opening using the method of above, measuring the actual flow rate across the control valve, comparing the two values to determine the difference between the actual and expected flow rates and determining if the difference is within an acceptable range of values from the expected flow rates to thereby establish the performance of the control valve.

The acceptable range of difference between the expected and actual flow rates, for the purposes of illustration, is known as a tolerance range. This range is any predetermined acceptable range that may be calculates as a percentage of the flow rate at a particular valve opening, for example, a 10% value from the expected flow rate at a particular valve opening, or it may be an absolute value from the expected flow rate, for example, ±10 pv, or +10 pv, or −10 pv, according to the desirement of a user.

In a variation, the acceptable range may be sub-divided into sub-ranges, for example, where the differential is ±1 pv, then the performance of the control valve is determined as 'excellent', and when the differential is ±1 pv to ±5.0 pv, then the control valve is determined as 'very good'; and when the differential is ±5.1 pv to ±10.0 pv, then the control valve is determined as 'good'. As can be appreciated, when the actual flow rate exceeds the pre-determined tolerance range, the control valve will be determined as 'unacceptable' and ear marked for investigation or rectification actions so as to pre-empt a full failure situation. The presence of sub-divided bends may also serve as an indication of when a next actual flow rate needs to be measured. For example, when the control valve is determined as 'excellent' the next time a measurement takes places would be four weeks later, and if it is determined as 'good' then a next measurement time would be one week later, etc.

Figure 3:
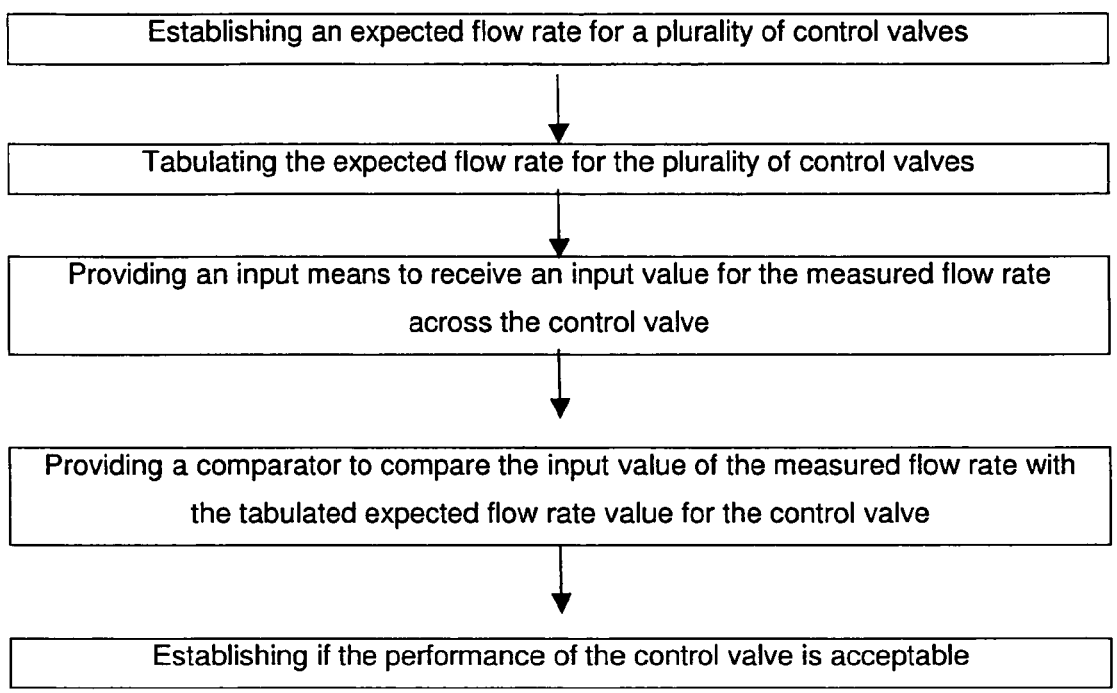
FIG. 3 shows a third aspect of the present invention depicting the method steps of providing a system to establish a performance of a control valve.

In a third aspect of the present application as illustrated in FIG. 3, the invention provides a method of providing a system to establish a performance of a control valve. The method including the steps of establishing expected flow rate values for a plurality of control valves used in a process operation, the types of control valves, be it linear or equal percentage, and at the various valve openings. The expected flow rates are then tabulated in a table of database for subsequent reference. An input means is provided to receive an input value for the measured flow rate across the control valve. This input means may be in the form of a keyboard, keypad or any other imputing devices available. A comparator is provided to compare the input and tabulated expected flow rate to establish if discussed, the performance may be established to be acceptable or unacceptable using a tolerance range as a basis. The tolerance range may be calculates as a percentage from the expected flow rate, or an absolute value from the expected flow rate. It is also envisioned that the tolerance range may differ for different control valves, or it may differ for control valves used in different portions of a process, for example, in a process where the sensitivity to flow rate deviation is high, then the tolerance range will be tighter and vice versa.

In a variation, the method may further provide a second input means to allow a user to input the identification code for a type of control valve, or type and location of the control valve, so that a correct expected flow rate and/or tolerance range may be obtained for a comparison to be performed, so as to establish a performance of the control valve.

Figure 4:
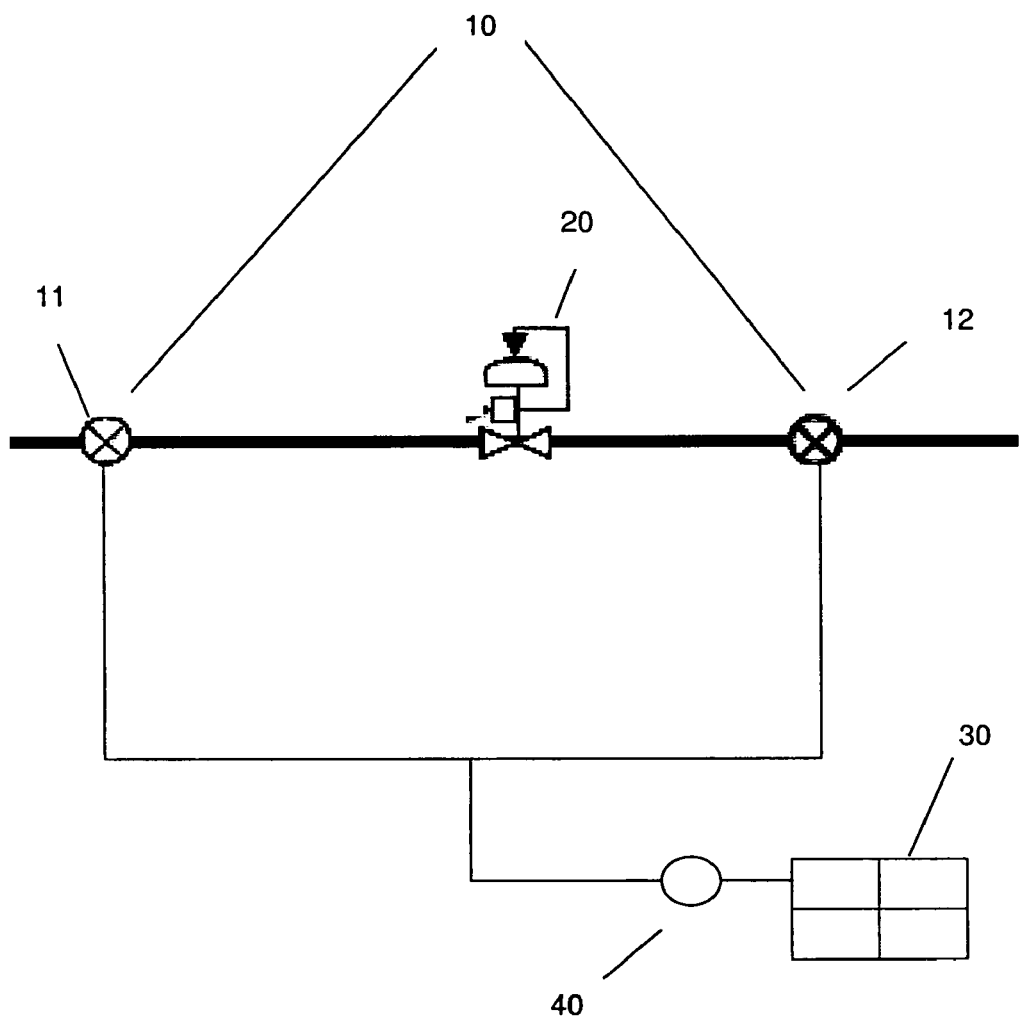
FIG. 4 shows a fourth aspect of the present invention depicting the system for establishing a performance of a control valve.

FIG. 4 illustrates a fourth aspect of the present invention depicting a system for establishing a performance of a control valve. As seen in FIG. 4, the system 100 includes a flow meter 10 to measure an actual flow rate across the control valve, shown in this figure as a first 11 and second 12 pressure gauge, to measure an actual flow across the control valve at interest 20. The system further includes a database or table 30 to tabulate the expected flow rate/s of the control valve, and a comparator 40 to allow a comparison between the measured flow rate and the tabulated expected flow rate to establish a performance of a control valve.

In an alternative, the system further provides a first input means to receive a user's input on an actual flow rate through a control valve of interest for a comparison to be performed. In another alternative, the system further provides a second input means to allow a user to input an identity of a control valve, or a locating of a control valve to allow a comparison to be performed. As can be appreciated from the preceding disclosure, the tolerance range to determine if the control valve is in an acceptable or unacceptable condition may be dependent on the type of control valve, and/or the location of the control valve. As previously discussed, the tolerance range may differ depending on the criticality and sensitivity of the process to which the control valve is supporting.

In a further alternative, the system further includes a display means to display the established performance of the control valve.

The embodiments of the invention have been advanced by way of example only, and modifications are possible within the scope of the invention as defined by the appended claims.

The invention claimed is:

1. A method for establishing an expected flow rate through a control valve having a determined valve flow coefficient, this method including the steps of:
   measuring a pressure at an upstream and downstream position of the control valve with a pressure sensor;
   determining a differential pressure value between the upstream and the downstream position of the control valve by a processor and;
   establishing an expected flow rate by the processor using a flow rate formula of $$Q = Cv \times \varphi(x) \times \sqrt{\frac{\Delta P}{G}}$$

where
   Q=flow rate,
   Cv=valve flow coefficient

ΔP=differential pressure value between the upstream and the downstream position of the control valve
G=specific gravity of fluid, and
φ(x)=an inherent characteristic of the valve.

2. A method according to claim 1, wherein the expected flow rate for a linear valve is established where the inherent characteristic is directly related to the valve opening or control valve lift with the relationship φ(x)=x, where x is a measure of a valve opening from a controller.

3. A method according to claim 1, wherein the expected flow rate for an equal percentage valve is established where the inherent characteristic φ(x) is the relationship:

$$\phi(x)=R^{-(1-x)}$$

where R is a rangeability and x is a measure of the valve opening from a controller.

4. A method according to claim 1, further including the steps of:
   measuring an actual flow rate across the control valve with a flow sensor;
   comparing the actual flow rate with the expected flow rate to determine the difference in value between the actual and expected flow rate by the processor;
   determining if the difference is within an acceptable range of values from the expected flow rate; and
   establishing the performance of the control valve.

5. A method according to claim 4, further including the step of providing a tolerance range within which the performance of the control valve is determined as acceptable.

6. A method according to claim 5, further including the step of:
   providing a result of the performance of the control valve, where when the actual and expected flow rate values differ within the tolerance range, the performance of the control valve is acceptable, and when the measured and expected flow rate values differ out of the tolerance range, the performance of the control valve is unacceptable.

7. A method according to claim 4, the method including the steps of
   obtaining a value of an actual flow rate across the control valve from the flow sensor;
   inputting the value of the actual flow rate into a system;
   receiving an output difference in value between the actual and expected flow rate; and
   receiving an information of the performance of the control valve.

8. A method according to claim 1, further including the steps of:
   establishing an expected flow rate for a plurality of control valves used in a process operation;
   tabulating the expected flow rate values for a plurality of control valve opening for each plurality of control valves used in a process operation;
   providing an input means to receive an input value for a measured actual flow rate across a control valve from the flow sensor;
   providing a comparator to compare the actual value of a measured flow rate and with the tabulated expected flow rate value for the control valve; and
   establishing if the performance of the control valve is acceptable.

9. A method according to claim 8, further including the step of providing a tolerance range within which the performance of the control valve is determined as acceptable.

10. A method according to claim 9, further including the steps of:
    providing a result of the performance of the control valve, where when the input and expected flow rate values differ within the tolerance range, the performance of the control valve is determined as acceptable; and
    when the measured and expected flow values differ out of the tolerance range, the performance is determined as unacceptable.

11. A method according to claim 8, the method including the steps of
    identifying a type of control valve of interest, said types including a linear valve and an equal percentage valve;
    obtaining a value of an actual flow rate across the control valve;
    inputting the value of the actual flow rate into a system;
    receiving an output difference in value between the actual and expected flow rate; and receiving an information of the performance of the control valve.

* * * * *